United States Patent [19]

Snider

[11] Patent Number: 5,508,931
[45] Date of Patent: * Apr. 16, 1996

[54] ROUTE GUIDANCE ON/OFF-ROUTE STATE FILTER

[75] Inventor: Peter Snider, San Carlos, Calif.

[73] Assignee: Zexel Corporation, Tokyo, Japan

[*] Notice: The portion of the term of this patent subsequent to Oct. 25, 2011, has been disclaimed.

[21] Appl. No.: 280,031

[22] Filed: Jul. 25, 1994

Related U.S. Application Data

[63] Continuation of Ser. No. 884,749, May 15, 1992, Pat. No. 5,359,529.

[51] Int. Cl.$^6$ .................................. G06F 165/00
[52] U.S. Cl. ..................... 364/449; 364/444; 364/450; 73/178 R; 340/988
[58] Field of Search ................. 364/443, 444, 364/445, 446, 447, 448, 449, 450, 453, 454, 424.02; 73/178 R; 340/988, 989, 990, 995; 342/450, 451, 457

[56] References Cited

U.S. PATENT DOCUMENTS

| | | | |
|---|---|---|---|
| 4,677,563 | 6/1987 | Itoh et al. | 364/449 |
| 4,796,191 | 1/1989 | Honey et al. | 364/450 |
| 4,924,402 | 5/1990 | Ando et al. | 364/449 |
| 4,999,783 | 3/1991 | Tenmoku et al. | 364/450 |
| 5,046,011 | 9/1991 | Kakihara et al. | 364/449 |
| 5,058,023 | 10/1991 | Kozikaro | 364/450 |
| 5,109,344 | 4/1992 | Kakihara et al. | 364/449 |
| 5,119,301 | 6/1992 | Shimizu et al. | 364/450 |
| 5,159,556 | 10/1992 | Shorter | 364/449 |
| 5,177,685 | 1/1993 | Davis et al. | 364/443 |
| 5,247,439 | 9/1993 | Gurmu et al. | 364/424.02 |
| 5,359,529 | 10/1994 | Snider | 364/449 |

Primary Examiner—Collin W. Park
Attorney, Agent, or Firm—Townsend and Townsend and Crew

[57] ABSTRACT

The invention provides a route state filter for a vehicle route guidance system for improved tracking of vehicle position with respect to a preselected route. A set of position possibilities are derived by comparing a measured vehicle position to a database containing data representing a map of roads, the possibilities corresponding to possible positions on the roads within an error region around the measured position. A route guidance module receives the position possibilities, checks their validity and applies a filter to remove less likely possibilities. A current position is then selected from the remaining possibilities. An ON/OFF ROUTE status of the vehicle is determined by comparing the selected position with the selected route information in the database. A distance-based filter is utilized to provide improved continuity in the route status determination. The route status is then used to set the system operating mode, and instructional information such as maneuvers, distances, and warnings are communicated to the driver.

18 Claims, 12 Drawing Sheets

ROUTE GUIDANCE ON/OFF-ROUTE STATE FILTER

This is a continuation of application Ser. No. 07/884,749 filed May 15, 1992, now U.S. Pat. No. 5,359,529.

BACKGROUND OF THE INVENTION

The present invention relates generally to route guidance systems for use in automobiles, and more specifically to methods and apparatus for determining vehicle position relative to a preselected route in such route guidance systems.

Known route guidance systems have a limited capacity for tracking the position of a vehicle relative to a map stored in a database. Frequently, such systems calculate vehicle position using dead-reckoning, wherein the vehicle's current position is determined by considering a known previous position of the vehicle and the direction and distance travelled since the previous position. In such dead-reckoning systems, it is necessary to measure the heading of the vehicle relative to a reference direction, as well as the distance travelled from a particular point. In order to measure vehicle heading, route guidance systems typically utilize a magnetic compass, as well as a gyroscope or other relative heading sensor. An odometer is typically used to measure distance travelled.

It has been found, however, that, for a variety of reasons, such dead reckoning systems suffer from significant error in determining vehicle position. This positioning error has been found to accumulate as the vehicle progresses. Factors contributing to this error include the measurement error associated with the heading and distance sensors, as well as erroneous measurements caused by, for example, local magnetic fields, environmental condition fluctuation and improper calibration of the sensors. Thus, while an ideal system might accurately determine vehicle position by merely comparing the measured position to the database to find a matching position on the map, in actuality, route guidance systems must compensate for the accumulating error in measured vehicle position to maintain a reasonable level of accuracy.

Where a measured position fails to correspond with a position on the route or on the map, route guidance systems must decide whether the discrepancy is due to an actual divergence of the vehicle from the roadways on the route or map, or whether the discrepancy is due merely to error in the measured position or error in the digitized data of the database. While a measured position lying a few feet off of a roadway on the map is most likely to be caused by measurement or database error, it is conceivable that the vehicle has pulled off of the roadway into a driveway or other place not part of the map database. Further, when a vehicle passes through a fork in a road, or is travelling along one of two parallel roads very close to one another, the inability to precisely measure vehicle position creates difficulty in determining on which of the possible roads the vehicle is actually located.

A number of known route guidance systems simply avoid this problem by assuming the vehicle is always on a road on the map, or always on the selected route. This simplifies the route guidance process to merely choosing the most likely road on which the vehicle is travelling, disregarding any indication that the measured position appears off-road or off-route.

In more sophisticated route guidance systems, vehicle position is tracked by calculating an error region surrounding the dead-reckoned position in which there is a high probability that the actual vehicle position will be located. The characteristics of the error region are typically a function of the accuracy of the sensors and the database, the region usually being determined based upon empirical data gathered through system testing.

In such systems, all road segments in the database falling within the error region are flagged as potential current positions of the vehicle, although some may be immediately excluded based on such factors as heading variation or lack of connectivity to a previous position. All or a selected portion of these position possibilities are then tracked to help determine which position possibilities generated at later points are likely to correspond to actual vehicle position, based on such factors as distance from the dead reckoned position, heading, connectivity, closeness of road segments on which the positions lie, and correlation in the shape of road segments to the path of vehicle travel. An exemplary vehicle positioning system using such an error region is seen in U.S. Pat. No. 4,796,191 entitled "Vehicle Navigational System and Method", the full disclosure of which is incorporated herein by reference.

During the time that this tracking of the error region is occurring, however, systems designed to provide route guidance must periodically notify the driver of whether s/he is still on the route, what maneuver is required next, whether the vehicle has arrived at the destination, and other such information. Such systems must therefore determine which of the plurality of position possibilities generated in the error region is the best choice for purposes of providing a position update to the driver. Typically, many of the position possibilities generated in the error region for purposes of tracking vehicle position are not useful in determining current position for purposes of providing route guidance updates to the driver. It is therefore necessary to filter the position possibilities generated for purposes of tracking vehicle position to remove those less useful for route guidance, and make a best estimate of a current position of the vehicle from the remaining position possibilities.

In light of the uncertainty associated with selecting a current position for route guidance purposes, a degree of error in the selection process is expected. Even where a vehicle is travelling continuously on roads on the route, in certain situations a system may tend to select on-route and off-route positions as close as seconds apart. Such systems will then communicate to the driver the changing status of vehicle position from on-road to off-road and back again, even though the vehicle has never left the route. Such fluctuations can confuse the driver and result in failure of the system to notify the driver of necessary maneuvers, arrival, road conditions and other route guidance information.

For these and other reasons, a route guidance system is desired which provides more accurate determinations of current position for purposes of providing route guidance updates. The system should be capable of compensating for the measurement error inherent in the heading and distance sensors, as well as in the digitized data of the map databases commonly used in vehicle navigation systems. Preferably, the method and apparatus should be tolerant of error within a given limit, such that the system maintains continuity in the route guidance information provided to the user. The method and apparatus should be capable of determining whether the vehicle position is on or off a preselected route. Further, the system and method should preferably communicate route information, upcoming maneuvers, arrival notification and other such information to the driver of the vehicle.

SUMMARY OF THE INVENTION

The present invention provides a method and apparatus for determining whether a vehicle is following a predetermined route on a map of roadways. The method and apparatus are used in conjunction with a vehicle navigation system which generates a set of position possibilities as well as a dead-reckoned position of the vehicle, and which utilizes a database of road map data.

In a preferred embodiment, the apparatus of the present invention comprises a route guidance module which receives a set of position possibilities derived from a comparison between the measured vehicle position and the database, filters the position possibilities to remove those less likely to correspond with the current position of the vehicle, selects a current position from the remaining possibilities, and determines whether the vehicle is on the selected route, off the route, or off all roads in the data base. This "route status" is then used to determine the next required maneuver of the vehicle, as well as to set the operating mode of the route guidance system. The next required maneuver, distance to destination, warnings and other instructions are then communicated to the user through an output communication means, such as a display screen. The format of the output communicated to the user is different depending upon the operating mode, i.e. whether the vehicle is considered on route, off route, or off road.

The route guidance module, in a preferred embodiment, selects the current position of the vehicle by comparing the position possibilities to the route data in the database and determining which, if any, are positions on the route. If there are no positions on the route, the route guidance module selects as the current position the position possibility with the highest probability of corresponding to actual vehicle position, based on such factors as proximity to the dead-reckoned position and correspondence of the heading of the position possibility with measured heading. If, on the other hand, there are position possibilities on the route, the route guidance module selects as the current position the position possibility furthest along the route toward the destination. This ensures that even if the selected position is incorrect, the selected position will be at worst ahead of the actual position, so that instructions, warnings and other output will be communicated to the driver early, rather than late.

In order to maintain continuity in the output communicated to the user and to avoid confusing changes in route status caused by errors in the determination of current position, the system utilizes a distance-based filter in the route status determination. A route state filter value is incremented each time the vehicle is detected to have a different route status than the previously determined route status, and decremented each time the route status is the same as the previously determined route status. Not until this filter value reaches an empirically-determined threshold is the route status changed and communicated to the user.

The method and apparatus of the present invention enable determining current vehicle position for route guidance purposes with greater accuracy and reliability. The method and apparatus tolerate a significant degree of error in the measured position, and greatly reduce confusing fluctuations in the route status and associated operating modes caused by measurement and database errors. Further, the method and apparatus of the present invention communicate route status, required maneuvers, warnings, arrival and other instructional information to the driver with improved reliability.

DETAILED DESCRIPTION OF THE SPECIFIC EMBODIMENTS

Figure 1:
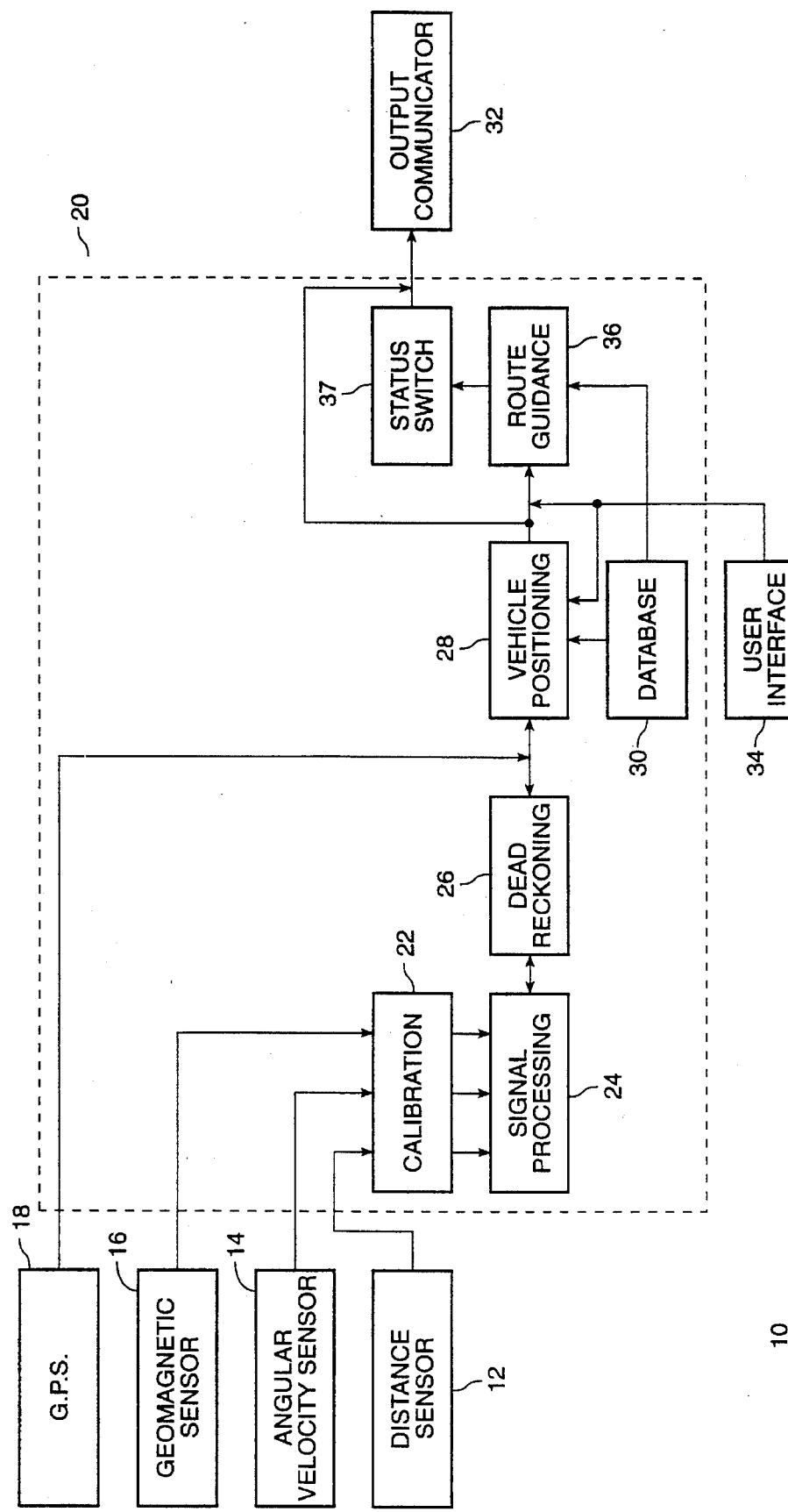
FIG. 1 is a schematic showing data flow in a route guidance system constructed in accordance with the principles of the present invention.
Figure 2:
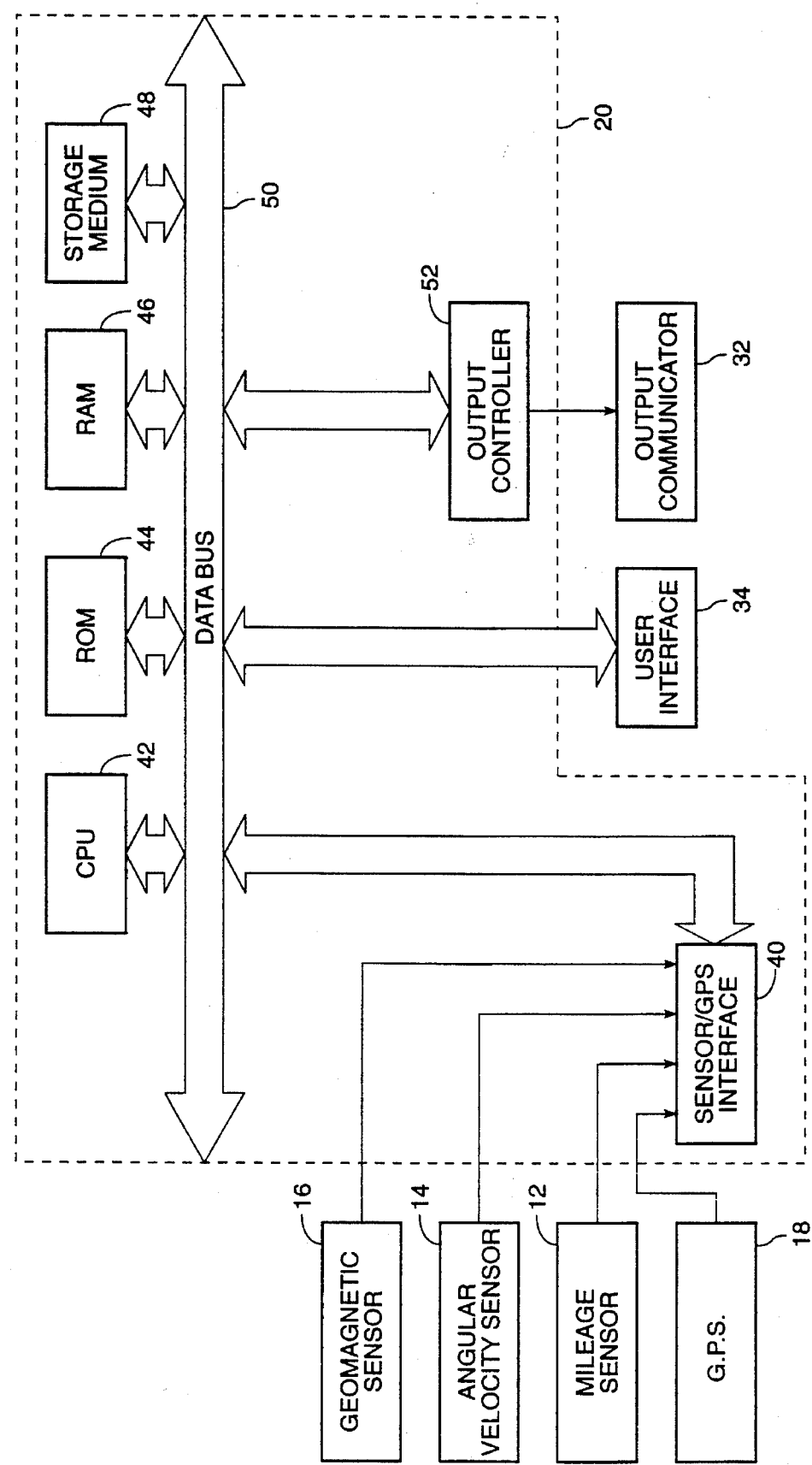
FIG. 2 is a schematic of a route guidance system constructed in accordance with the principles of the present invention.

FIGS. 1 and 2 schematically illustrate an exemplary embodiment of a vehicle route guidance system 10. Referring first to FIG. 1, route guidance system 10 includes a plurality of sensors for determining vehicle position, including a distance sensor 12, angular velocity sensor 14 and geomagnetic sensor 16. In typical embodiments, the angular velocity sensor comprises a gyroscope, or a differential odometer coupled to the wheels of the vehicle. The geomagnetic sensor usually comprises a magnetic compass mounted in the vehicle. A global positioning system (GPS) data receiver 18 is provided for receiving signals from, for example, a satellite-based navigation system.

Data from sensors 12–16 is input to computing means 20, and adjusted to compensate for sensor measurement errors in calibration means 22. Sensor calibration methods are described in application Ser. No. 07-883,859, now U.S. Pat. No. 5,345,382, entitled "Calibration Method For A Relative Heading Sensor," the complete disclosure of which is incorporated herein by reference.

The calibrated sensor data is transmitted to signal processing means 24, which uses the sensor measurement data to calculate a vector describing the travel of the vehicle from a previously determined position to the measured position. This vector is then used to determine a dead-reckoned position of the vehicle by dead-reckoning means 26. The dead-reckoned position is then forwarded to map matching means 28, which compares the dead-reckoned position to a map database 30.

The map database 30 preferably comprises positional data such as, for example, latitude and longitude coordinates, to describe road intersections, road segments, landmarks and points of interest, and other geographical information. The database may further comprise data representing characteristics of roads or places on the map, such as road and place names, road features such as dividers, one-way restrictions, surface, speed limit, shape, elevation, and other properties. The data typically is scored in digital form on a storage medium such as an optical disk, magnetic disk or integrated circuit.

Using the data stored in database 30, vehicle positioning module 28 generates one or more possible positions of the vehicle by comparing the dead-reckoned position to the road segments, intersections, and other geographical locations stored in the database. Usually, a plurality of such position possibilities are generated, for reasons which will be elaborated below, and the position possibilities are provided to the route guidance module 36. Route guidance module 36 filters the set of position possibilities and selects from the remaining position possibilities a position deemed to be the current position of the vehicle.

The user may select a desired destination which is input through user interface 34, typically comprising a keyboard. Route guidance module 36 compares the selected destination with the data in database 30 and identifies the selected destination among the map data. Route guidance module 36 then calculates an optimum route between the initial position of the vehicle and the desired destination, taking account of distances, road speeds, one-way streets, and, in some embodiments, variable data such as traffic information or road construction work. The selected route comprises a set of data representing the road segments, intersections, and other geographical features between the initial position of the vehicle and the desired destination.

The current position selected from the position possibilities provided by vehicle positioning means 28 is compared to the data making up the selected route, to locate the position of the vehicle with respect to the route.

The driver of the vehicle is kept informed of vehicle position, upcoming maneuvers, and other relevant information through an output communication means 32, which may comprise a display screen or an audio speaker. In a preferred embodiment, when the vehicle is at a position along the selected route, the screen display of output communication means 32 will display an icon representing the next maneuver required, e.g., hard right or left turn, right or left turn, easy right or left turn, continue straight ahead, or combinations thereof. Alternatively, an audio speaker may audibly inform the vehicle driver of upcoming maneuvers and other information.

If route guidance module 36 determines that the position of the vehicle does not correspond to any position along the selected route, vehicle status switch 37 is switched from an ON-ROUTE mode to an OFF-ROUTE mode. This causes the output communication means 32 to display a map of the area in which the vehicle is travelling, showing the position of the vehicle on the map. It is thought that displaying a simple icon in the ON-ROUTE mode provides a quickly legible indication of upcoming maneuvers which will minimize distraction of the driver. On the other hand, once the vehicle has gone OFF-ROUTE, it has been found that displaying a map of the locality and the position of the vehicle with respect to the map is most helpful in assisting the driver to return to the route. Further, once the vehicle has moved OFF-ROUTE, it is likely that the driver will move out of traffic and stop the vehicle in order to determine his or her location. Thus, more detailed information in map form can be displayed in the OFF-ROUTE state with less likelihood of distracting the driver.

Figure 3:
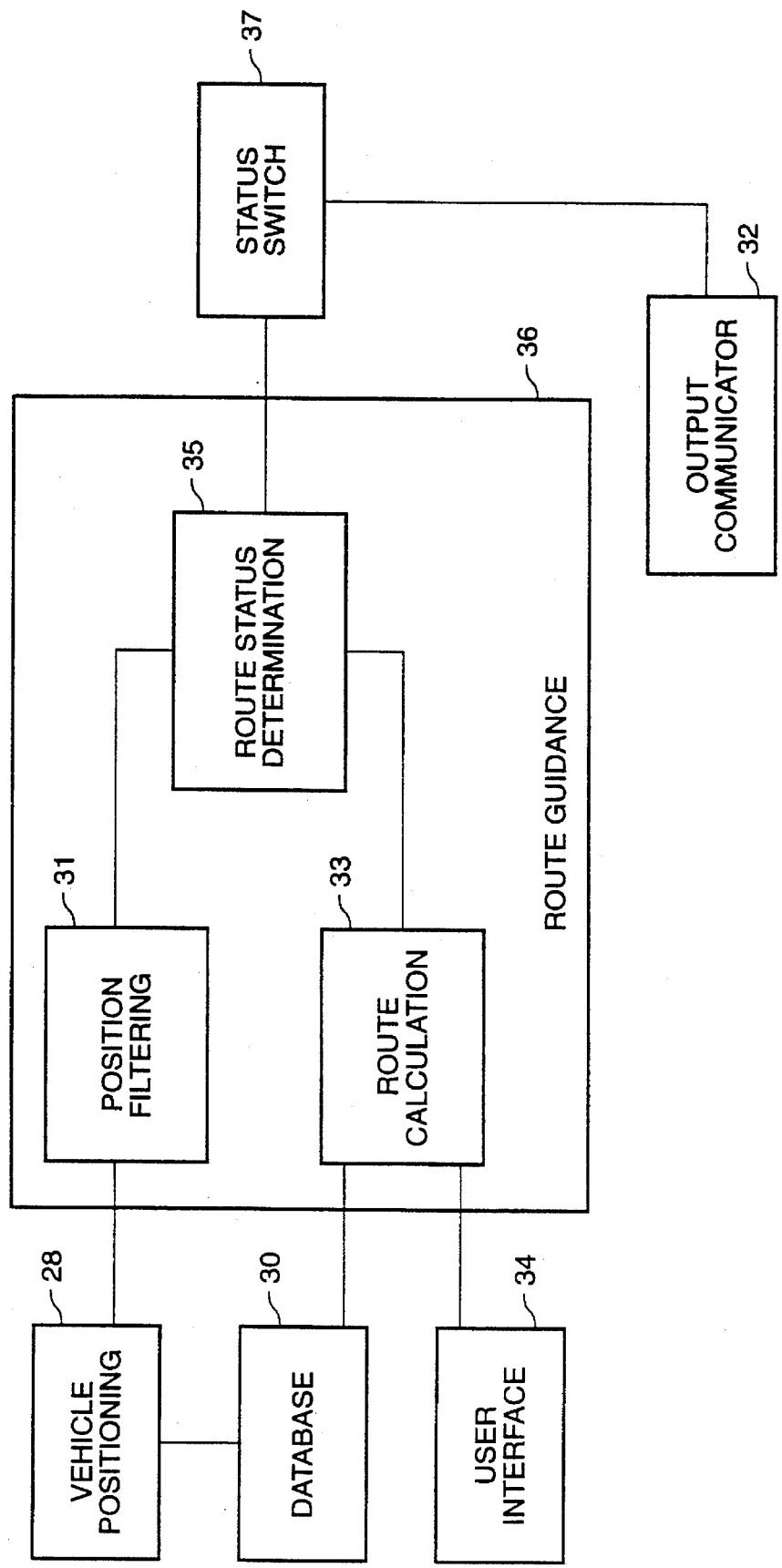
FIG. 3 is a schematic of the route guidance module in the route guidance system of FIG. 2.

Referring to FIG. 3, route guidance module 36 includes a route calculation section 33 which receives the destination input from user interface 34, compares the destination to the map data in database 30 and calculates the optimum route to the destination. Position possibilities generated by vehicle positioning module 28 are received by position filtering section 31, which, as will be described more fully below, eliminates less likely position possibilities and selects a current position of the vehicle. Route status determination section 35 then compares the current position received from position filtering section 31 with the route calculated in route calculation section 33, to determine whether the vehicle is in a position corresponding to the route. If so, the route status is given a value of ON-ROUTE and status switch means 37 is placed in an ON-ROUTE position. The system is thus operating in an ON-ROUTE mode, and output communicator 32 displays an icon representing the upcoming maneuver, or makes an audible indication of the maneuver over an audio speaker.

On the other hand, if route status determination section 35 determines that the current position of the vehicle is not on the route, status switch means 37 is actuated to place the system in an OFF-ROUTE mode. In the OFF-ROUTE mode, output communicator 32 displays a map of the area in which the vehicle is travelling, usually showing the position of the vehicle on the map. Other operating modes may include OFF-ROAD, wherein no position possibilities could be found in the database to match the dead-reckoned position, and OFF-MAP, wherein all position possibilities are outside of the bounds of the map currently being utilized.

FIG. 2 schematically illustrates an exemplary embodiment of the hardware of computing means 20. Sensors 12 to 16 and GPS receiver 18 are coupled to computing means 20 through sensor/GPS interface 40. Data from interface 40 is transmitted to CPU 42, which performs the calibration, signal processing, dead-reckoning, vehicle positioning, route guidance and status switching functions described above. Database 30 may be stored in storage medium 48, with software directing the operation of computing means 20 stored in ROM 44 for execution by CPU 42. RAM 46 permits reading and writing of the information necessary to execute such software programs. Storage medium 48 may comprise a hard disk drive, CD-ROM or integrated circuit onto which digitized map information has been stored. Output controller 52, which may comprise a graphics controller for a display screen, receives data processed by CPU 42 and transmits such data to output communicator 32, usually comprising a display screen. The user may input data, such as a desired destination, through user interface 34, typically comprising a keyboard.

In the route guidance system 10 of FIGS. 1 and 2, vehicle positioning module 28 periodically sends a set of position possibilities to route guidance module 36. An exemplary vehicle positioning module is described in U.S. Pat. No. 4,796,191, the disclosure of which is incorporated herein by reference. Route guidance module 36 must select the best position for determining whether the vehicle is ON-ROUTE or OFF-ROUTE from the position possibilities generated by vehicle positioning module 28. Preferably, the vehicle positioning module 28 sends to the route guidance module 36 only those position possibilities useful in determining the route status of the vehicle, ideally (for an extremely accurate measurement system) a single position. Typically, however, the vehicle positioning module 28 generates a number of position possibilities which are used in the vehicle positioning process, but which are not generally relevant to the process of selecting route status. This is due in large part to the potential error in the measured position determined by the output of sensors 12–16.

Figure 5A:
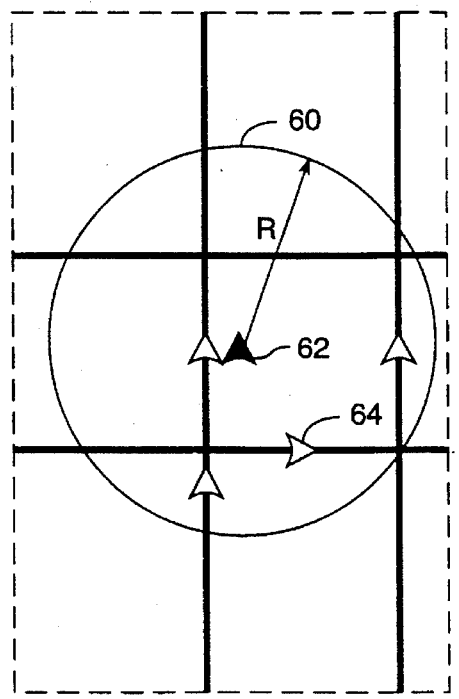
FIGS. 5A and 5B are representations of a map containing position possibilities generated by the vehicle positioning module of the route guidance system of FIG. 2.
Figure 5B:
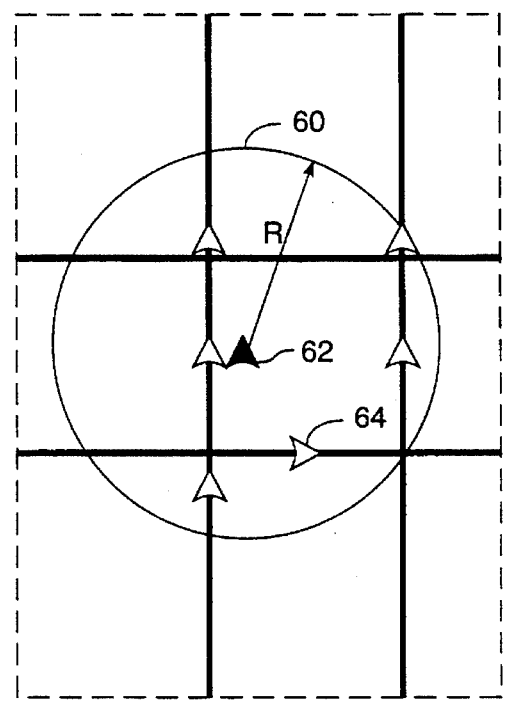

This error in the measured position requires the vehicle positioning module 28 to track all position possibilities falling within an error region as shown in FIGS. 5A and 5B.

Error region 60 is defined by a center 62 corresponding to the dead-reckoned position and a radius R empirically determined such that the error region has a high likelihood of encompassing the actual vehicle position when the error in the measured position is a maximum. The vehicle positioning module 28 receives the dead-reckoned position 62 and calculates the error region surrounding the dead-reckoned position. The vehicle positioning module then surveys database 30 to generate a plurality of position possibilities 64 lying on road segments falling within error region 60.

Various vehicle positioning algorithms may be employed by vehicle positioning module 28 in generating position possibilities 64. FIG. 5A illustrates the result of one vehicle positioning algorithm, which tends to generate position possibilities in a region behind and even with the dead-reckoned position 62 relative to the direction of travel. A second type of vehicle positioning module tends to generate position possibilities that are distributed on all sides of the dead-reckoned position, as shown in FIG. 5B. The route guidance module 36 of the present invention is designed to be adaptable to a variety of vehicle positioning modules, regardless of the algorithm used for generating position possibilities.

Figure 6:
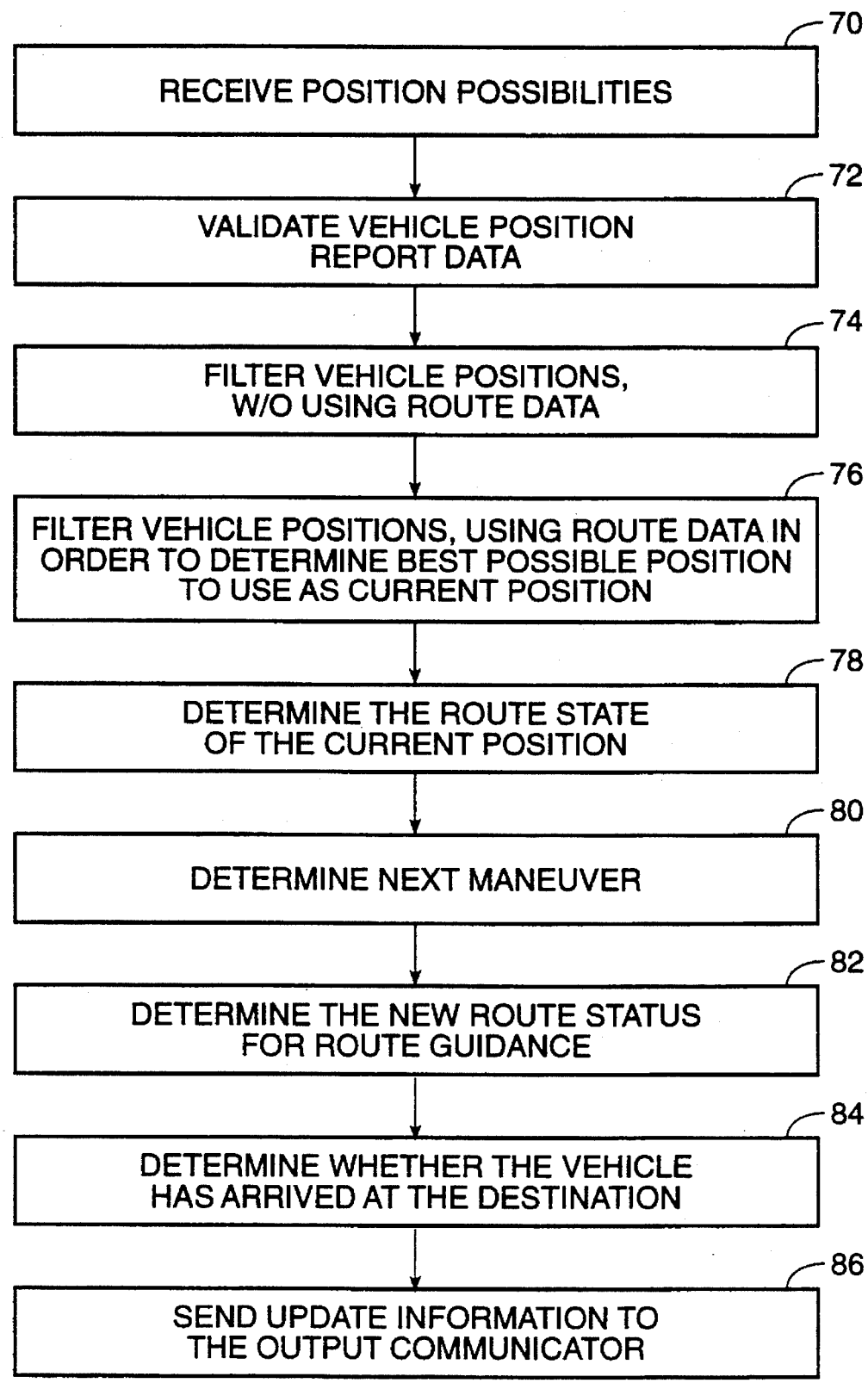
FIGS. 6–11 are flowcharts of the steps executed by the route guidance module of FIG. 3.

FIG. 6 illustrates a preferred embodiment of the operation of route guidance module 36. Typically, the steps shown in FIG. 6 are carried out in a software program stored in ROM 44 and executed by CPU 42 in the computing means 20 of the route guidance system. Route guidance module 36 first receives position possibilities generated by vehicle positioning module 28 (step 70). CPU 42 then checks to determine whether all of the position possibilities contain valid data (step 72). Usually, this step involves a determination of whether the vehicle position possibility data falls within a predetermined range, such that any of the vehicle position possibilities is potentially a current position of the vehicle. This range is determined empirically, and is usually a function of the distance from a previous known position. If any of the position possibilities are found to contain invalid data, they are eliminated from the set and not considered further.

Figure 7A:
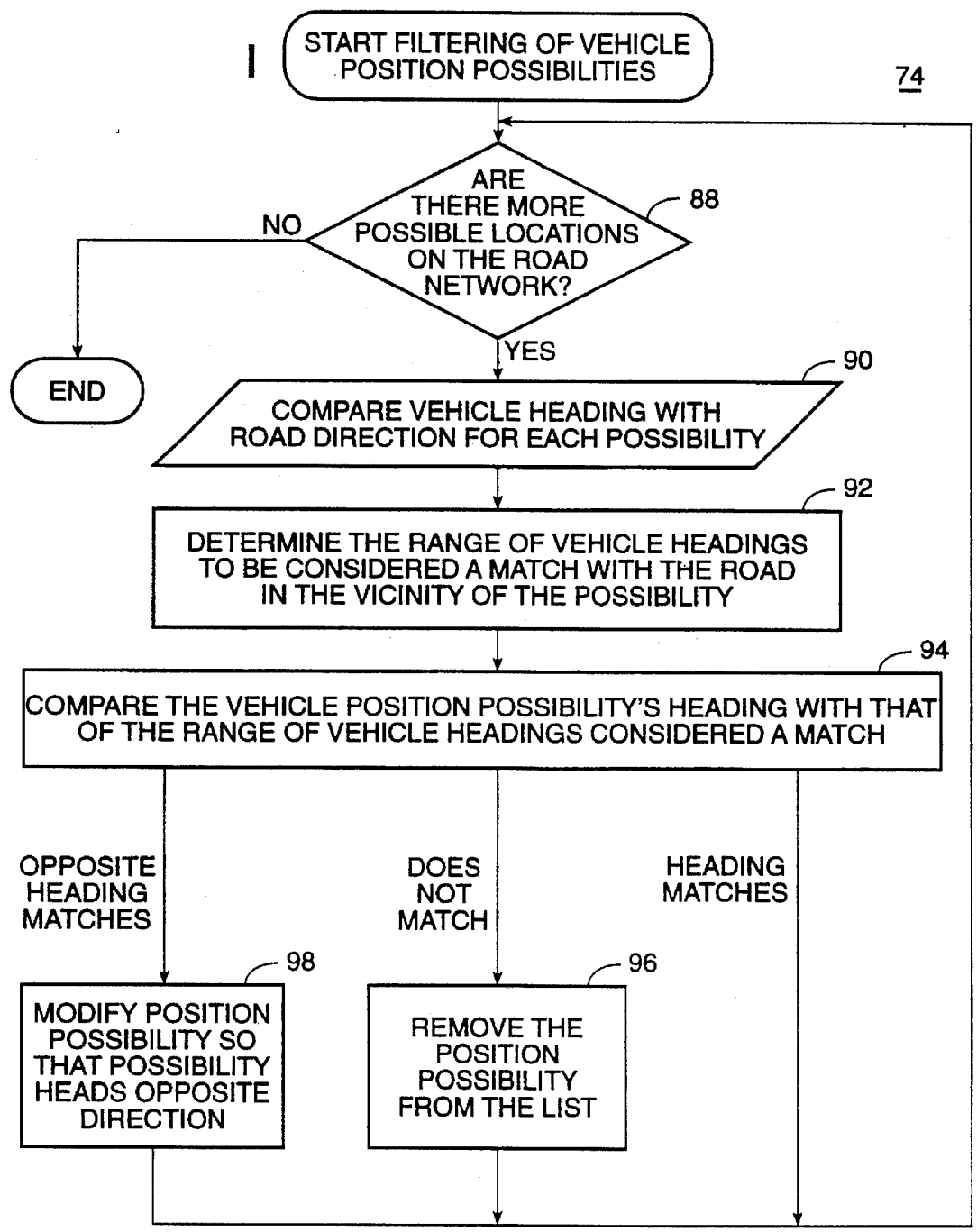

The route guidance module 36 then filters the vehicle position possibilities, without considering the selected route (step 74). Step 74 is shown in greater detail in FIGS. 7A and 7B. As shown in FIG. 7A, CPU 42 first determines whether there are position possibilities which have not yet been filtered (step 88). If so, CPU 42 compares the measured vehicle heading generated by the heading sensors 14, 16 to the direction of the road segment on which each position possibility lies (step 90). CPU 42 then determines what range of vehicle headings within which the heading of the road segment must lie in order to be considered a potential current position. Usually, this range will be defined as the measured heading plus or minus approximately 45°, in order to allow for inaccuracies in heading measurement from sensors 14, 16, inaccuracies in database 30 and other possible causes of discrepancies between measured heading and the heading of the road segment (step 92). CPU 42 then compares the position possibility heading with the range of vehicle headings considered a match (step 94). If the vehicle position possibility heading falls within the range, the heading is considered a match, CPU 42 returns to the beginning of the filtering procedure 74, and the procedure is repeated for each position possibility in the set.

If the heading of the position possibility is not within the range, the heading is not considered a match and that position possibility is removed from the set of position possibilities (step 96). If, however, the heading of the vehicle position possibility is not within the range, but it is opposite the measured heading of the vehicle—that is, approximately 180° from the measured heading—the position possibility is modified so as to have a heading corresponding to the measured heading (step 98). This compensates for vehicle positioning modules which are slow to report a 180° turn, such as a U-turn. If the heading difference between the measured heading and the vehicle position possibility is around 180°, it is considered likely that the discrepancy is due to the failure of vehicle positioning module 28 to report the turn, rather than an extremely large error in the measured heading.

Figure 7B:
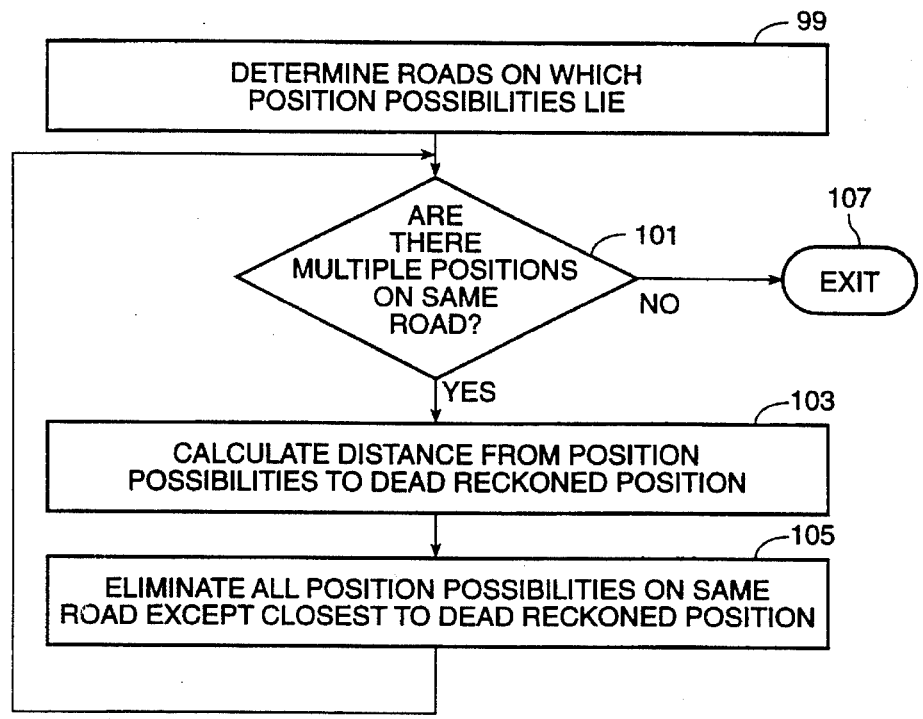

FIG. 7B illustrates a second stage in the filtering process without using route information. After executing the steps shown in FIG. 7A, CPU 42 examines database 30 to determines on what road each remaining position possibility is located (step 99). The CPU then asks whether there are multiple position possibilities on the same street (step 101). If so, the distance between each same-street position possibility and the dead-reckoned position is calculated using latitude/longitude coordinates (step 103). The CPU then eliminates all position possibilities on the same street except the one closest to the dead-reckoned position (step 105). This is repeated for all of the same-street possibilities until all of the position possibilities are on different streets, and the CPU exits the routine (step 107). If two or more position possibilities on the same road are equidistant from the dead reckoned position (e.g. on a curved road), none are eliminated.

Figure 8:
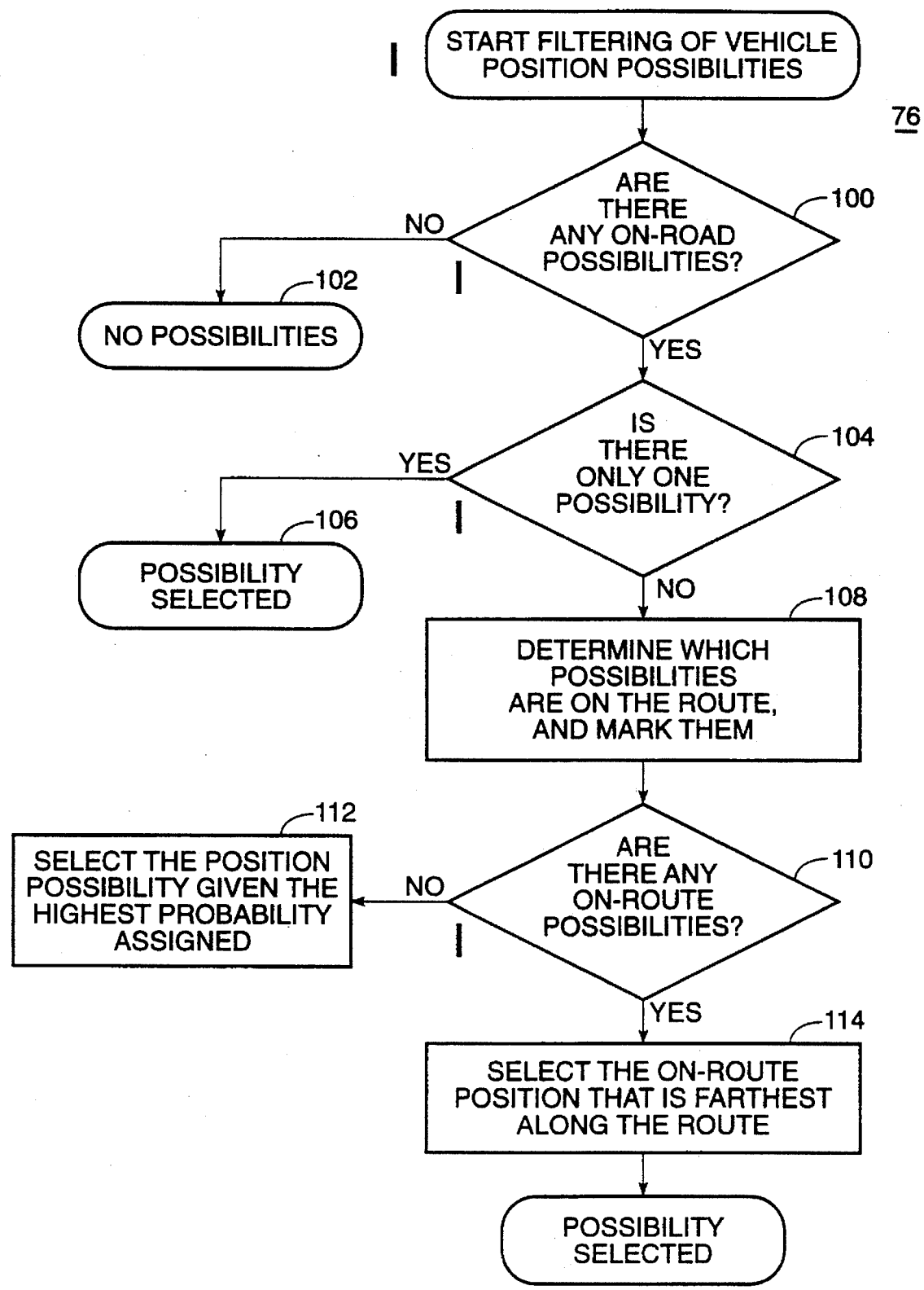

Referring again to FIG. 6, after filtering step 74, route guidance module 36 filters the remaining position possibilities using the data representing the selected route in order to determine the best position possibility to be designated as the current position of the vehicle (step 76). As shown in FIG. 8, CPU 42 examines the remaining position possibilities to determine whether any of the position possibilities are on a road segment of the database 30 (step 100). Usually, vehicle positioning module 28 will only generate position possibilities which are on road segments in database 30. Therefore, in a case where no possible positions of the vehicle on the roads in the database can be found by the vehicle positioning module, no position possibilities will be sent to the route guidance module, and the answer to the inquiry of step 100 will be "no". CPU 42 then generates an indication that no position possibilities exist, and exits the procedure (step 102).

If the position possibilities do include positions corresponding to road segments in database 30, CPU 42 asks whether there exists only one such possibility (step 104). If there is only one possibility, that possibility is selected as the current position of the vehicle (step 106). If more than one on-road possibility exists, CPU 42 compares the position possibilities with the road segments of the database defining the selected route to determine which of the possibilities are on the route (step 108). Each of these ON-ROUTE possibilities is flagged.

CPU 42 then surveys the position possibilities and asks whether any of the position possibilities have been flagged as ON-ROUTE (step 110). If there are no position possibilities flagged as ON-ROUTE possibilities, the CPU selects the position possibility which has been given the highest probability value by the vehicle positioning module (step 112). This probability is assigned to each position possibility by the vehicle positioning module 28 based on such factors as distance of the position possibility from dead-reckoned position and the correspondence between the heading of the position possibility and the measured heading of the dead-reckoned position. Other factors such as vehicle speed may also be considered in assigning this probability.

If ON-ROUTE position possibilities have been found, CPU 42 selects, in a preferred embodiment, the ON-ROUTE position possibility that is furthest along the route toward the destination (step 114). Selecting the ON-ROUTE position possibility that is furthest along the route has been found to be accurate when used in conjunction with a vehicle positioning module which generates position possibilities in the region behind and even with the dead-reckoned position, as shown in FIG. 5A. Selecting the ON-ROUTE position possibility that is furthest along the route has the advantage of providing, in the worst case, a current position which is farther ahead on the route than the actual position of the vehicle. This avoids the possibility of selecting a current position behind the actual position of the vehicle, where the route guidance system might fail to provide timely instructions and warnings to the driver of necessary maneuvers, arrival, and other such information.

When a vehicle positioning module generating position possibilities on all sides of the dead-reckoned position is utilized with the route guidance module, such as that illustrated in FIG. 5B, route guidance module 36 would use an alternative algorithm for selecting the current position from the ON-ROUTE position possibilities. Such an algorithm might select a current position according to, for example, the probability given to each position possibility by the vehicle positioning module 28, the distance of the position possibility from the dead-reckoned position, or other criteria.

Referring once again to FIG. 6, after filtering the vehicle positions in step 76, CPU 42 has made one of three determinations: (1) that there are no on-road position possibilities; (2) that the current position corresponds to a road on the database, but not on the route; or (3) that the current position corresponds to a position on a road on the selected route. CPU 42 then determines the route state of the current position (step 78).

Figure 9:
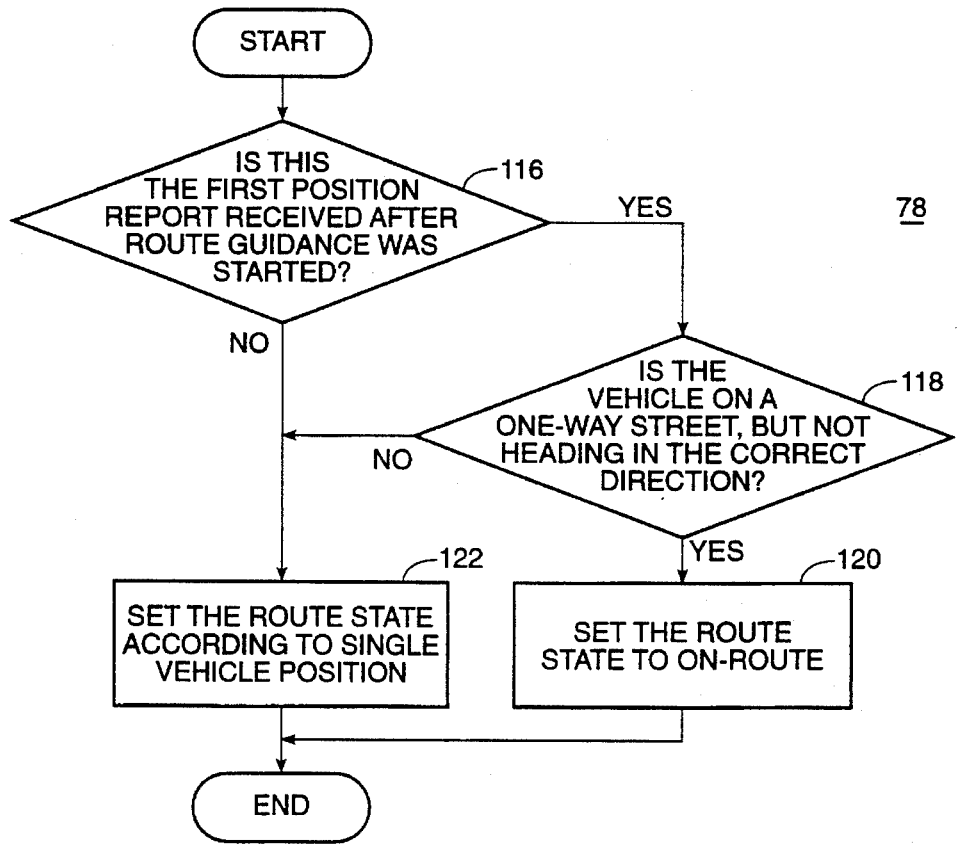

As shown in FIG. 9, CPU 42 first determines whether the set of position possibilities received from vehicle positioning module 28 was the first set of position possibilities received since route guidance was started (step 116). If route guidance has just been initiated by the user, and the set of position possibilities generated by the vehicle positioning module 28 is the first set of positions which have been generated for tracking the vehicle with respect to the selected route, the CPU then examines the position possibility selected as the current position to determine whether it is an ON-ROUTE position on a one-way street, but differs from the dead-reckoned position only in that the heading is approximately 180° different than the measured heading (going the wrong way on the street) (step 118). If this is the case, even though the position possibility selected as the current position has not been flagged as an ON-ROUTE possibility, CPU 42 sets the route state of the current position to ON-ROUTE (step 120). This is done in order to ensure that the driver of the vehicle is provided with maneuver instructions and other necessary route guidance information when the vehicle is just beginning its travel to the destination. For example, if the vehicle is located in a parking lot, oriented in a direction opposite the flow of traffic on an adjacent one-way street, the measured position will indicate a heading different than the one-way street, so that the position possibility will be considered OFF-ROUTE. However, it is desirable that the system display the upcoming maneuvers required to navigate to the selected destination. For this reason, CPU 42 assigns the position possibility an ON-ROUTE state so that the route guidance system remains in ON-ROUTE mode.

If the position possibilities received from vehicle positioning module 28 are not the first set of positions received for the particular route, or if the position possibility is not on a one-way street heading in the wrong direction, the CPU 42 sets the route state of the current position according to the route state of the selected position possibility—that is, to ON-ROUTE if the current position possibility has been flagged as ON-ROUTE, or OFF-ROUTE if the current position is not corresponding to any positions on the selected route (step 122).

Figure 10:
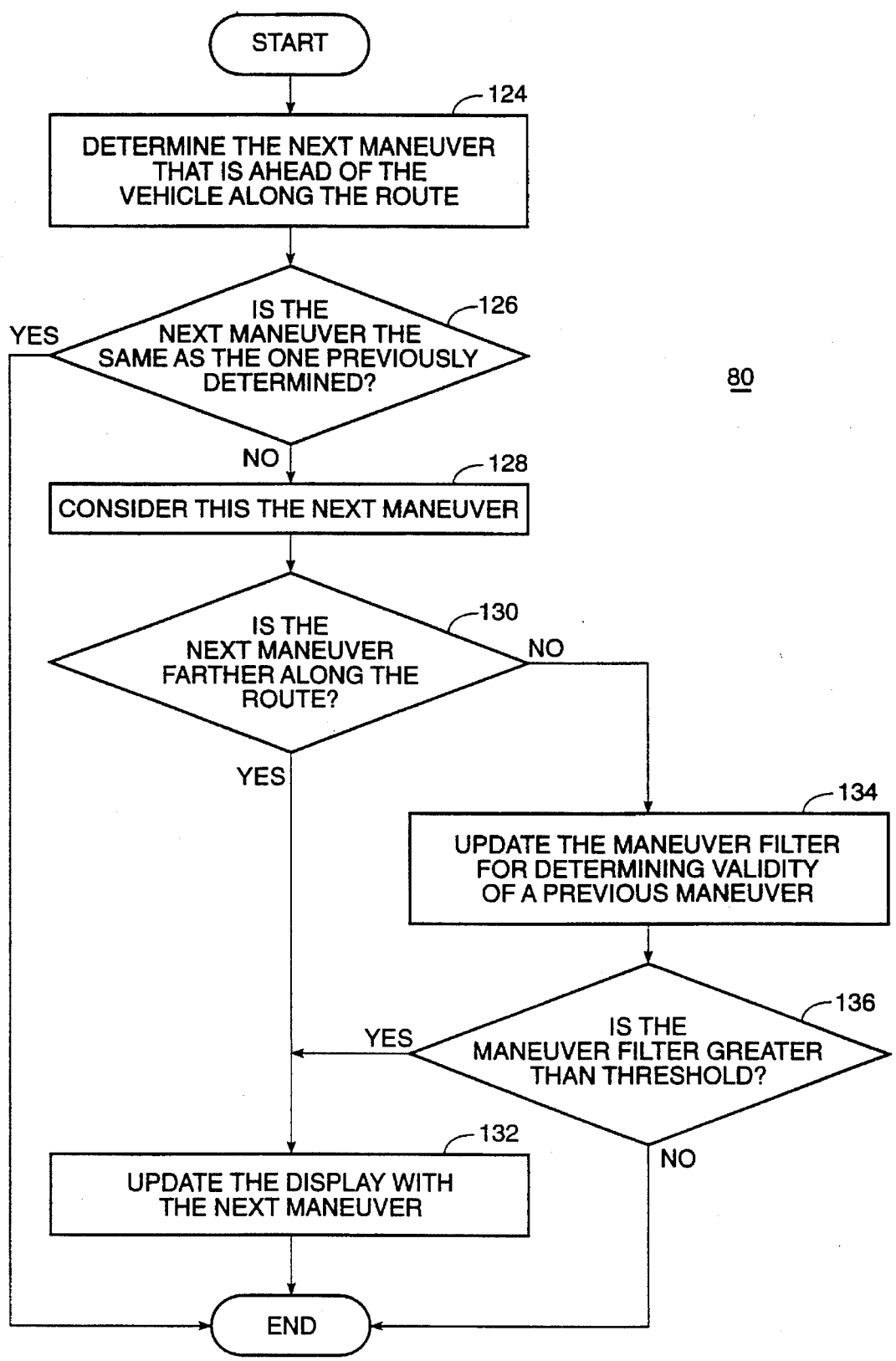

Referring again to FIG. 6, once the route state of the current position has been determined, CPU 42 determines the next required maneuver the driver must make in order to remain on the route (step 80) As illustrated in FIG. 10, the next required maneuver is determined by first determining the next maneuver that is ahead of the vehicle along the route (step 124). This is determined by examining the road segments of the data base defining the route ahead of the current position of the vehicle and determining whether a maneuver such as a left or right turn, hard left or right turn, easy left or right turn, or a combination among these will be necessary at an upcoming point on the route.

The next maneuver required on the route is then compared with the previous maneuver required, as determined from the previous set of position possibilities received from the vehicle positioning module 28 (step 126). If the next maneuver is the same as the previous maneuver, CPU 42 exits the procedure 80, having decided that there is no need to update the maneuver being communicated to the driver of the vehicle.

If the next maneuver is not the same as the previously determined maneuver, the next maneuver is flagged (step 128) and the CPU asks whether the selected next maneuver is farther along the route than the previously determined maneuver (step 130). CPU 42 examines the route data in database 30 to determine if the position of the next required maneuver is further along the route than the previously required maneuver. If so, output communication means 32 is updated to display or otherwise communicate to the driver the next maneuver (step 132).

If it is found that the previously determined maneuver is farther along the route than the next maneuver, a distance-based filter value for the previously determined maneuver is updated (step 134). This is done in order to properly track the vehicle in the exceptional case where a vehicle travels through a maneuver (e.g., a turn) and returns to a previous section of the route rather than continuing onto the next section of the route. In such a case, the current position of the vehicle will be on a part of the route which has previously been travelled through; however, the next maneuver expected by the system will be at a position further along the route than the actual next maneuver (which has already been executed once). Therefore, when the next maneuver selected in step 124 lies at a position on the route which is behind the previously determined maneuver, it must be determined whether the previously determined maneuver is valid and should remain displayed as the next maneuver, or whether the display should be changed to repeat a maneuver already executed.

To accomplish this, CPU 42 stores a value which is increased incrementally each time it is determined that the next maneuver is behind the previously determined maneuver (step 134). If this distance-based filter value reaches a threshold (step 136), then the output communication means 32 is updated to communicate the new next maneuver (step 132). If the distance-based filter value is not greater than the threshold after being increased, the previously determined maneuver is considered to be the next required maneuver and communication means 32 is not updated.

Figure 11:
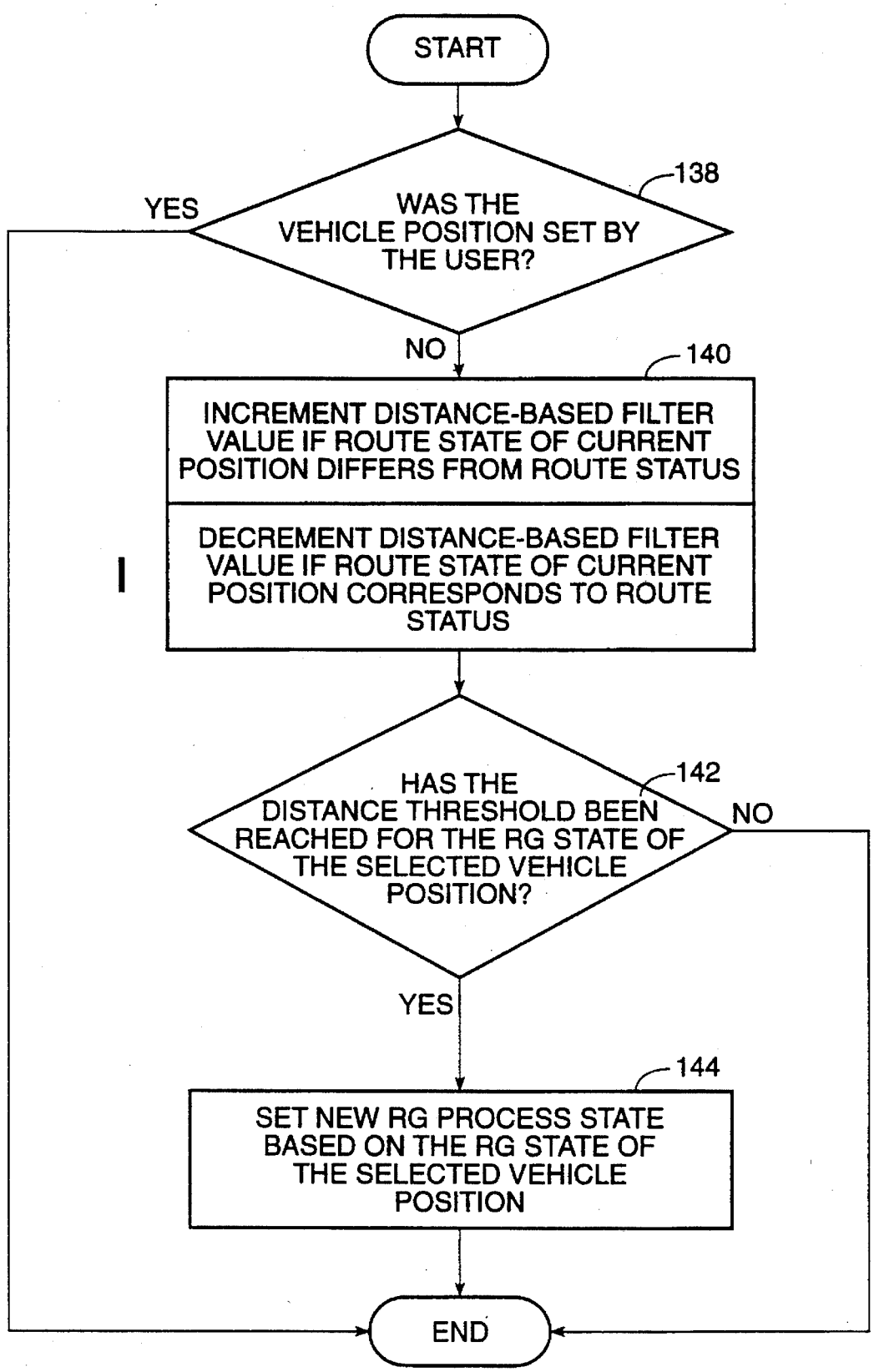

Returning to FIG. 6, CPU 42 next determines the route status of the vehicle (step 82). This determination, illustrated in FIG. 11, begins with an inquiry as to whether the current position of the vehicle was input by the user, rather than being selected by route guidance module 36 in the process described above. If the user knows the current location of the vehicle, s/he may input the position through user interface 34. If vehicle position has been set by the user in this way (step 138), the position is considered to be accurate and the route status is set to ON-ROUTE if the position lies on the route, OFF-ROUTE if the position lies off the route but on a road on the map of the database, or OFF ROAD if the set position does not correspond to any road in the database.

If the current vehicle position was not set by the user, but determined by the route guidance module as described above, there remains a possibility that the current position does not correspond to the actual position of the vehicle, due to errors in measured position, data in database 30, position possibility selection by vehicle positioning module 28 or current position selection by route guidance module 36. It is desirable to accommodate such potential error in the determination Of route status so as to avoid repeated route status changes between OFF-ROUTE and ON-ROUTE (and the associated change in the operating mode of the route guidance system) each time a new set of position possibilities is generated.

Figure 12:
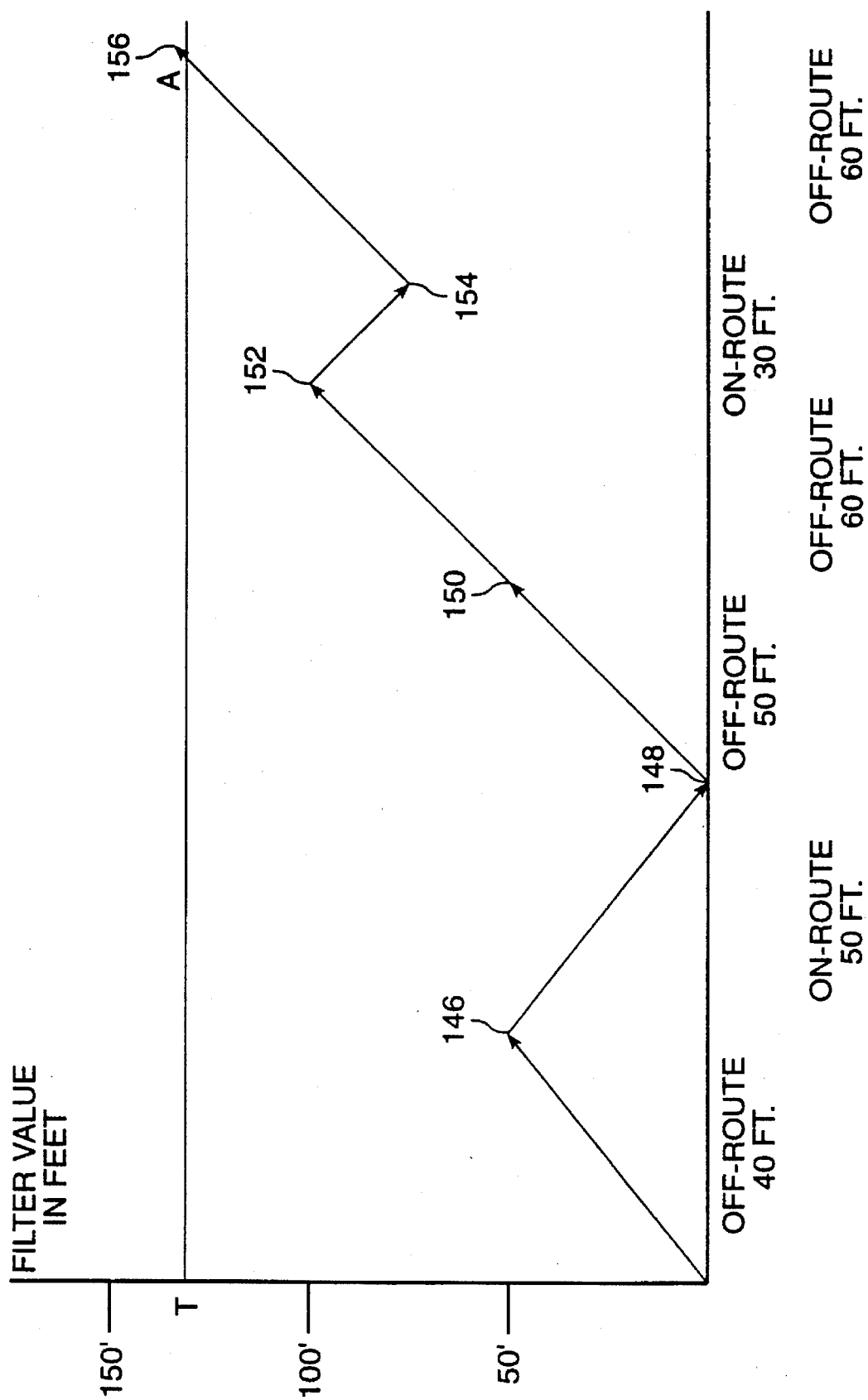
FIG. 12 is a graphical representation of the route state filter employed by the route guidance module of FIG. 3.

For this reason, a distance-based filter, illustrated in FIG. 12, is employed, wherein a filter value is incremented each time the current position selected by the route guidance module has a route status different than the previously determined route status of the vehicle, and decrementing the filter value by an incremental distance each time the route state of the current position is the same as the previously determined route status. Thus, if the previously determined route status of the vehicle is ON-ROUTE, and at position 146 a current position is selected which has a route state of OFF-ROUTE, the filter value is incremented by 50 feet, the distance from the previous position as measured by distance sensor 12. When the next current position is selected at position 148, the route state of the current position is ON-ROUTE again, so the filter value is decremented 50 feet back to zero. At points 150 and 152 the current positions have a route state of OFF-ROUTE, so the filter value is incremented at each point, while at step 154 the current position has an ON-ROUTE state so the filter value is again decremented. Finally, at point 156, with a current position again having a route state of OFF-ROUTE, the filter value exceeds threshold T. Not until threshold T is exceeded is the route status of the vehicle changed from ON-ROUTE to OFF-ROUTE.

Referring again to FIG. 11, CPU 42 increments the distance filter value where the route state of the current position is different than the previously-determined route status of the vehicle, or decrements the state filter distance value where the route state of the current position corresponds to the previously-determined route status of the vehicle (step 140). CPU 42 then compares the filter value with the threshold T to determine whether the threshold has been reached (step 142). If the filter value remains less than the threshold, the route status of the vehicle remains unchanged. If, however, the threshold has been reached, CPU 42 sets the route status of the vehicle to a new route status, the route state of the current position (step 144). The threshold value T is determined empirically, based on vehicle speed and road type.

Returning to FIG. 6, once the route status of the vehicle has been determined, CPU 42 then makes a determination as to whether the vehicle has arrived at the destination (step 84). CPU 42 compares the current position with the destination selected by the user to determine whether the current position corresponds to or is beyond the position of the destination. If so, CPU 42 generates a signal that arrival has occurred.

Figure 4A:
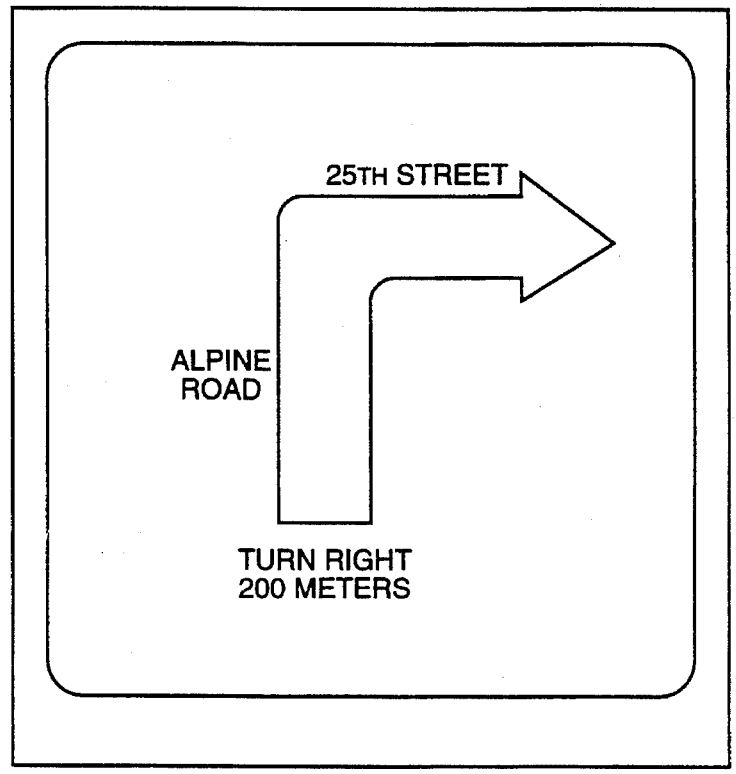
FIGS. 4A and 4B are front views of a screen display of the route guidance system of FIG. 2.
Figure 4B:
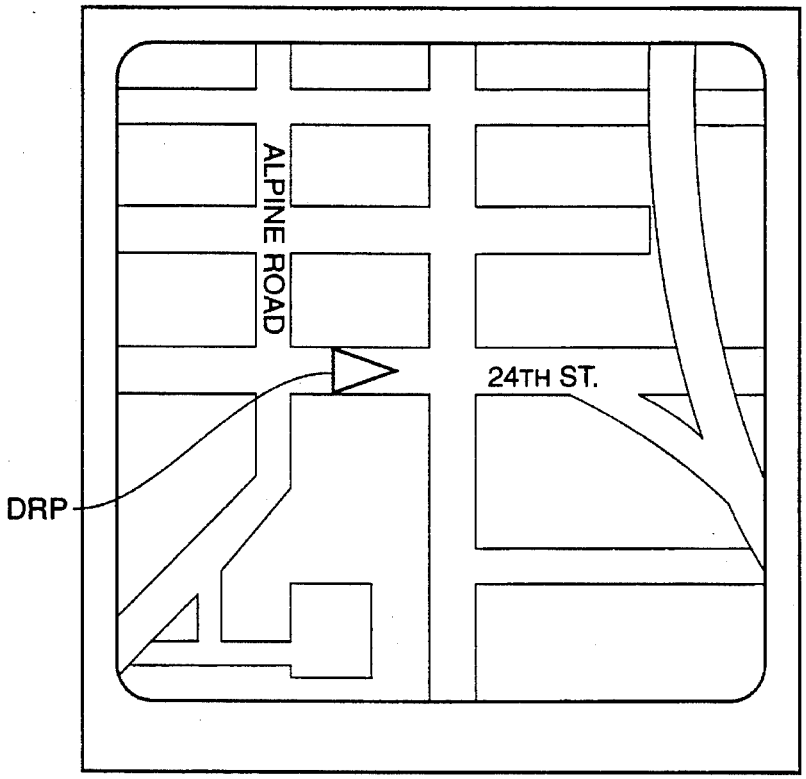

Finally, output communication means 32 is updated with the various information generated in the above-described procedures (step 86). First, based upon the route status determination, the operating mode of the route guidance system is set according to the route status. The system generally operates in one of three operating modes, an OFF ROAD mode, an OFF-ROUTE mode or an ON-ROUTE mode. A major distinction between the operating modes is the nature of the output communicated to the driver of the vehicle. In the OFF ROAD and OFF-ROUTE modes, a map of the locality in which the vehicle is travelling is displayed with the dead-reckoned position shown on the map, as shown in FIG. 4B. In the ON-ROUTE mode, as shown in FIG. 4A an icon representing the next required maneuver, along with other instructional information, is displayed in a simplified and legible manner so as to minimize distraction of the driver while conveying critical information. Alternatively, in the ON-ROUTE mode, an audio speaker may inform the driver of necessary maneuvers, distances, and other information. Another OFF-MAP mode may also be used, indicating that all possible vehicle positions are outside of the bounds of the map being utilized.

Once the system operating mode has been set, CPU 42 sends the update information to the output communication means 32. This update information includes the next required maneuver, the remaining distance to the next maneuver, any warning or attention messages describing upcoming maneuvers or required preparation for those maneuvers and notification of route status change. Such information may be displayed on a screen or audibly communicated to the user through an audio speaker.

While the invention has been described with reference to specific embodiments, it will be understood by those skilled in the art that various alternative, modifications and equivalents may be used without departing from the scope of the invention. Therefore, the above description should not be taken as limiting the scope of the invention, which is defined by the appended claims.

What is claimed is:

1. A method for determining whether a vehicle is following a predetermined route on a map of roadways, said route comprising a selected portion of said roadways, the method comprising the steps of:

receiving a set of position possibilities corresponding to possible positions of said vehicle on said roadways of said map;

verifying that the set of position possibilities are valid possibilities, thereby generating a first subset of position possibilities;

filtering the first subset of position possibilities without reference to said predetermined route to remove those least likely to correspond to an actual position of the vehicle, thereby generating a second subset of position possibilities;

filtering the second subset of position possibilities with reference to said predetermined route, thereby generating a set of remaining position possibilities;

selecting a current position from the remaining position possibilities; and determining a route status of the vehicle based on said current position and said predetermined route.

2. The method according to claim 1 wherein said step of verifying comprises determining whether said position possibilities are within a selected range of values.

3. The method according to claim 1 wherein said step of filtering the first subset comprises:

eliminating each position possibility having a heading outside of an expected heading range, the expected heading range including a measured heading of the vehicle plus an angular error region; and eliminating all position possibilities on a first roadway except a closest position possibility, the closest position possibility being closest to a dead-reckoned position.

4. The method according to claim 1 further comprising the step of determining whether a maneuver of the vehicle is required, the maneuver being selected from the group consisting of left turn, right turn, U-turn, hard left, hard right, easy left, easy right, and combinations thereof.

5. The method according to claim 4 further comprising communicating the required maneuver to a user.

6. The method according to claim 1 further comprising comparing the current position to an intended destination to determine whether arrival has occurred.

7. The method according to claim 1 further comprising communicating the route status to a user.

8. The method according to claim 1 further comprising:

reading a heading sensor and a distance sensor;

calculating a dead-reckoned position using heading and distance readings;

comparing said dead-reckoned position to said map of roadways; and deriving said position possibilities, wherein said position possibilities comprise positions on said roadways within an error region having said dead-reckoned position as its center.

9. A route guidance module in a vehicle navigation system for determining whether a vehicle is following a predetermined route on a map of roadways, said route comprising a selected portion of said roadways, said navigation system calculating a dead-reckoned position of said vehicle and further generating a set of position possibilities of said vehicle on said roadways, said route guidance module comprising:

means for receiving said set of position possibilities;

means for verifying that each of said position possibilities is a valid possibility, thereby generating a first subset of position possibilities;

means for filtering the first subset of position possibilities without reference to said predetermined route to remove those least likely to correspond to an actual position of the vehicle, thereby generating a second subset of position possibilities;

means for filtering the second subset of position possibilities with reference to said predetermined route, thereby generating a set of remaining position possibilities;

means for selecting a current position from the remaining position possibilities; and means for determining a route status of the vehicle based on said current position and said predetermined route.

10. The route guidance module according to claim 9 wherein said means for verifying comprises means for determining whether said position possibilities are within a selected range of values.

11. The route guidance module according to claim 9 wherein said means for filtering the first subset comprises:

means for eliminating each position possibility having a heading outside of an expected heading range, the expected heading range including a measured heading of the vehicle plus an angular error region; and means for eliminating all position possibilities on a first roadway except a closest position possibility, the closest position possibility being closest to a dead-reckoned position.

12. The route guidance module according to claim 9 further comprising means for determining whether a maneuver of the vehicle is required, the maneuver being selected from the group consisting of left turn, right turn, U-turn, hard left, hard right, easy left, easy right, and combinations thereof.

13. The route guidance module according to claim 12 further comprising means for communicating the required maneuver to a driver of said vehicle.

14. The route guidance module according to claim 9 further comprising means for comparing the current position to an intended destination to determine whether arrival has occurred.

15. The route guidance module according to claim 9 further comprising means for communicating the route status to a driver of said vehicle.

16. The route guidance module according to claim 9 wherein said navigation system includes means for switching between at least a first ON ROUTE mode and a second OFF ROUTE mode according to said route status, the route guidance module further comprising means for communicating said route status to said switching means.

17. The route guidance module according to claim 9 wherein said navigation system comprises:

means for reading a heading sensor and a distance sensor;

means for calculating said dead-reckoned position using heading and distance readings;

means for comparing said dead-reckoned position to said map of roadways; and means for deriving said position possibilities, wherein said position possibilities comprise positions on said roadways within an error region having said dead-reckoned position as its center.

18. A route guidance system for determining whether a vehicle is following a predetermined route on a map of roadways, said route guidance system comprising:

means for storing said map of roadways;

means for reading a heading sensor and a distance sensor;

means for calculating a dead-reckoned position using heading and distance readings;

means for comparing said dead-reckoned position to said map of roadways;

means for deriving a set of position possibilities, said position possibilities comprising positions on said roadways within an error region having said dead-reckoned position as its center;

means for verifying that each of said position possibilities is a valid possibility, thereby generating a first subset of position possibilities;

means for filtering the first subset of position possibilities without reference to said predetermined route to remove those least likely to correspond to actual position of the vehicle, thereby generating a second subset of position possibilities means for filtering the second subset of position possibilities with reference to said predetermined route, thereby generating a set of remaining position possibilities;

means for selecting a current position from the remaining position possibilities;

means for comparing said current position to said predetermined route to determine a route status of the vehicle, said route status comprising an ON ROUTE status or an OFF ROUTE status; and means for communicating said route status to a user of the route guidance system.

* * * * *